United States Patent [19]
Thacker

[11] 3,741,267
[45] June 26, 1973

[54] VALVES FOR TUBELESS TIRES

[75] Inventor: Stephen Ernest William Thacker, Erdington, Birmingham, England

[73] Assignee: Scovill Manufacturing Company, Waterbury, Conn.

[22] Filed: Sept. 22, 1971

[21] Appl. No.: 182,691

[30] Foreign Application Priority Data
Sept. 25, 1970 Great Britain.................. 45,783/70
Apr. 20, 1971 Great Britain.................. 10,270/71
July 29, 1971 Great Britain.................. 35,775/71

[52] U.S. Cl. .............................................. 152/427
[51] Int. Cl. ........................................... B60c 29/00
[58] Field of Search ..................... 152/427, DIG. 11

[56] References Cited
UNITED STATES PATENTS
3,610,312  10/1971  Killmarx ............................. 152/427
3,191,655  6/1965   McCord ....................... 152/DIG. 11
2,837,134  6/1958   Steer ............................ 152/DIG. 11
2,481,142  9/1949   Mueller et al. ............... 152/DIG. 11

Primary Examiner—James B. Marbert
Attorney—Dallett Hoopes

[57] ABSTRACT

A valve for a tubeless tire including a tubular insert adapted to accommodate a valve core, a resilient stem having an axial bore for receiving a portion of the tubular insert and a hard radially expandable member integral with the stem which constricts the axial bore of the resilient stem to grip projections on the surface of the insert.

13 Claims, 4 Drawing Figures

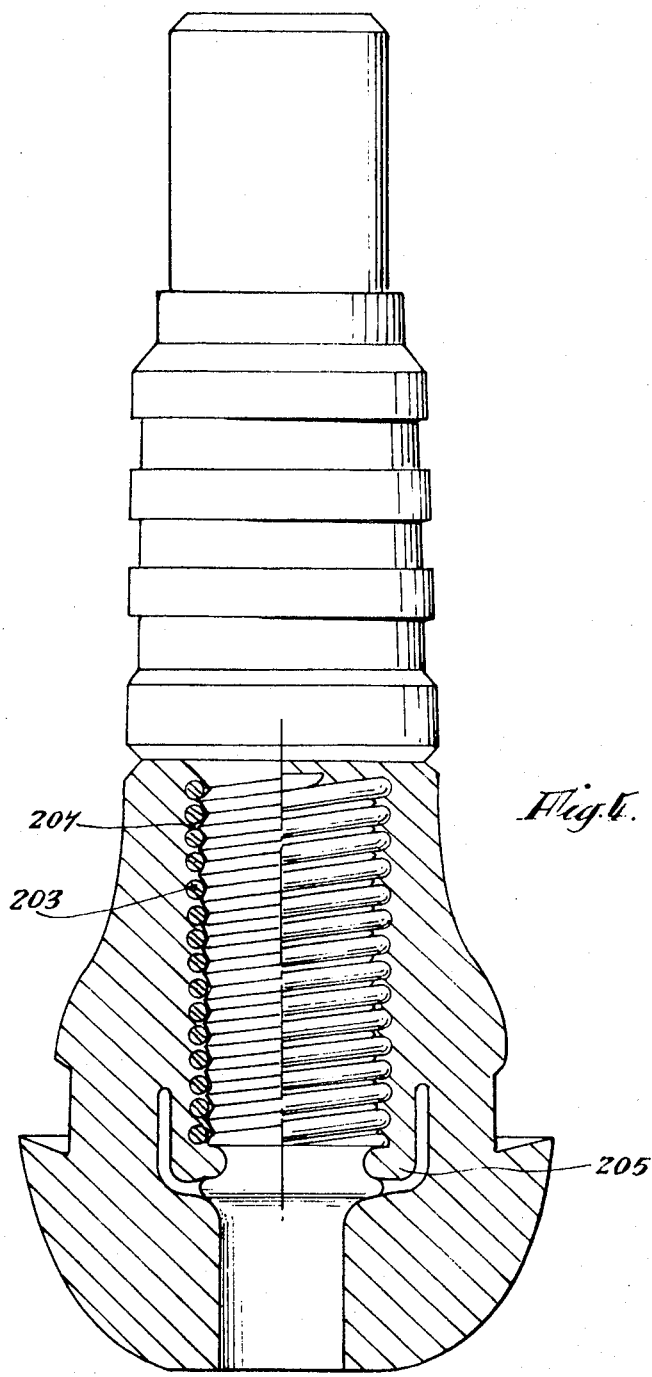

VALVES FOR TUBELESS TIRES

This invention relates to valves for tubeless tyres.

A previously known valve comprises a resilient rubber housing having a shank portion and an enlarged base portion shaped for insertion into and retention in a wheel rim, the shank portion surrounding a rigid tubular insert which contains a valve core. It is essential that the insert is secure within the housing and sealed against escape of air from the tyre. This has been achieved by using metal inserts, usually brass, which are bonded, chemically or by adhesive, to the rubber of the housing over their contiguous surfaces.

It is an object of the present invention to dispense with the need for bonding the insert and rubber housing together.

According to the invention there is provided a valve for a tubeless tyre including a tubular insert adapted to accommodate a valve core, a resilient housing having an axial bore for receiving a portion of the tubular insert, and a hard radially expandable member integral with the housing which constricts the axial bore of the resilient housing to grip projections on the surface of the insert.

In one preferred embodiment, the radially expandable member is a hard helical member, preferably a spring embedded in the resilient housing around the surface of the axial bore.

In an alternative embodiment, the radially expandable member is a tubular louvred member embedded in the resilient housing around the surface of the axial bore, the louvres being inwardly and downwardly extending with respect to the bore so that on insertion of the insert the louvres may expand to allow the insert to pass but will resiliently grip the projections on the insert to prevent its being pulled out of the housing.

Preferably the insert is a plastics material, which may be glass filled nylon, but it may be any other rigid material such as metal.

The resilient housing may be of synthetic or natural rubber, or a suitable plastics material and may have an enlarged base portion adapted for insertion into and retention in a wheel rim.

Preferably the projections on the insert are conical serrations suitable for engagement in the bore of the housing constricted by the hard radially expandable member. Alternatively, the projections may be square sections in the form of a buttress thread. Preferably the serrations have sharp corners for good engagement and are preferably undercut. Furthermore, when the radially expandable member is a helical spring, the projections may be a screw-thread.

Particular embodiments of the invention will now be described with reference to the accompanying drawings, in which:

FIG. 4 is a part-sectional view of a fourth embodiment.

Figure 1:
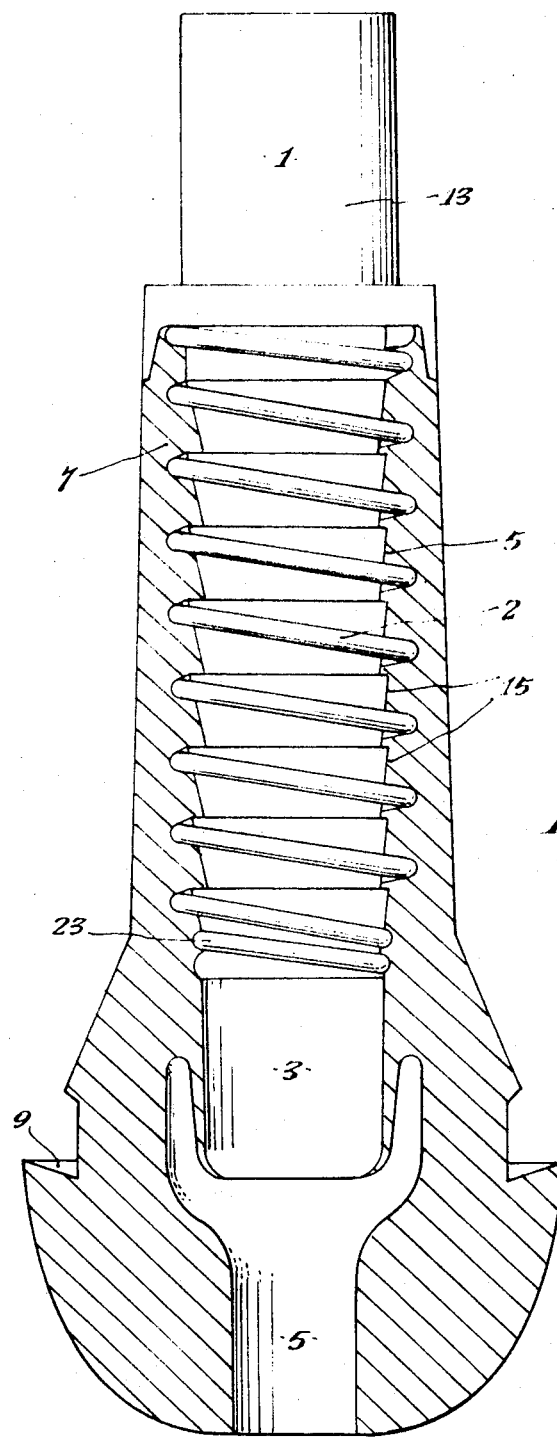
FIG. 1 is a part-sectional view through a first embodiment showing the insert.

Referring to the embodiment of FIG. 1, a valve 1 for a tubeless tyre includes a tubular insert 13 which has an axial bore adapted to accommodate a valve core (not shown). A portion of the tubular insert 13 is enclosed in an axial bore 5 of a resilient housing 7.

The lower portion of the housing 7 is enlarged and has a shoulder 9 which engages the edge of a rim hole in a wheel rim (not shown) on insertion of the valve in a manner known per se.

The insert 13 is secured relative to the housing 7 by means of a hard radially expandable member, which is in this case a coil compression spring 2 moulded into the housing 7 around the surface of the part of the axial bore 5 which contains the insert 13. The coils of the spring 2 are embedded in the housing during moulding of the latter. The diameter of the bore 5 is smaller than the diameter of the insert 13.

Two lower coils 23 of the spring 2 are of a smaller diameter than the rest. This is mainly as an aid to manufacture, during placing of the spring into the housing; the spring 2 can be held by these coils 23 so as to keep the spring centred. The said lower coils also provide increased grip on the insert 13 when the valve is assembled.

The insert 13 has on its surface a number of projections in the form of conical serrations 15 which engage in the bore 5, constricted by the rubber covered coils of the spring 2, which assist in securing the insert. The diameter of the insert 13 is chosen to be greater than the internal bore of the housing 7 before insertion so that a force fit is obtained, the insert being held in position by a gripping action of the spring. Preferably, the dimensions are chosen to give a good interference fit between the bore 5 and the spring and the conical serrations, the maximum interference being when the narrowest parts on the insert are wider than the widest part of the internal surface of the housing.

During assembly, the insert 13 is inserted under pressure into the top of the housing 7 containing the spring 2. This pressure causes compression of the spring and resilient housing, which effectively opens out the coils of the spring to enlarge the bore 5 and allow passage of the insert 13. The end 3 of the insert is forced through the smaller coils 23 which engage in the first recess of the insert. The pressure is released and the spring and resilient housing tend to recover, the bore 5 thus contracts and grips the insert 13. Attempts to pull the insert 13 back out of the housing 7 are resisted by the spring 2, any such loads which tend to extend the spring cause the coils further to contract and the bore 5 to grip harder onto the insert. Attempts to twist the insert out of the housing give rise to torsional forces which tend to wind-up the spring again resulting in contraction and increased grip.

The insert 13 is therefore very securely retained in the housing 7 by the mechanical action of the spring 2, dispensing with the need for chemical bonding or adhesive.

Figure 2:
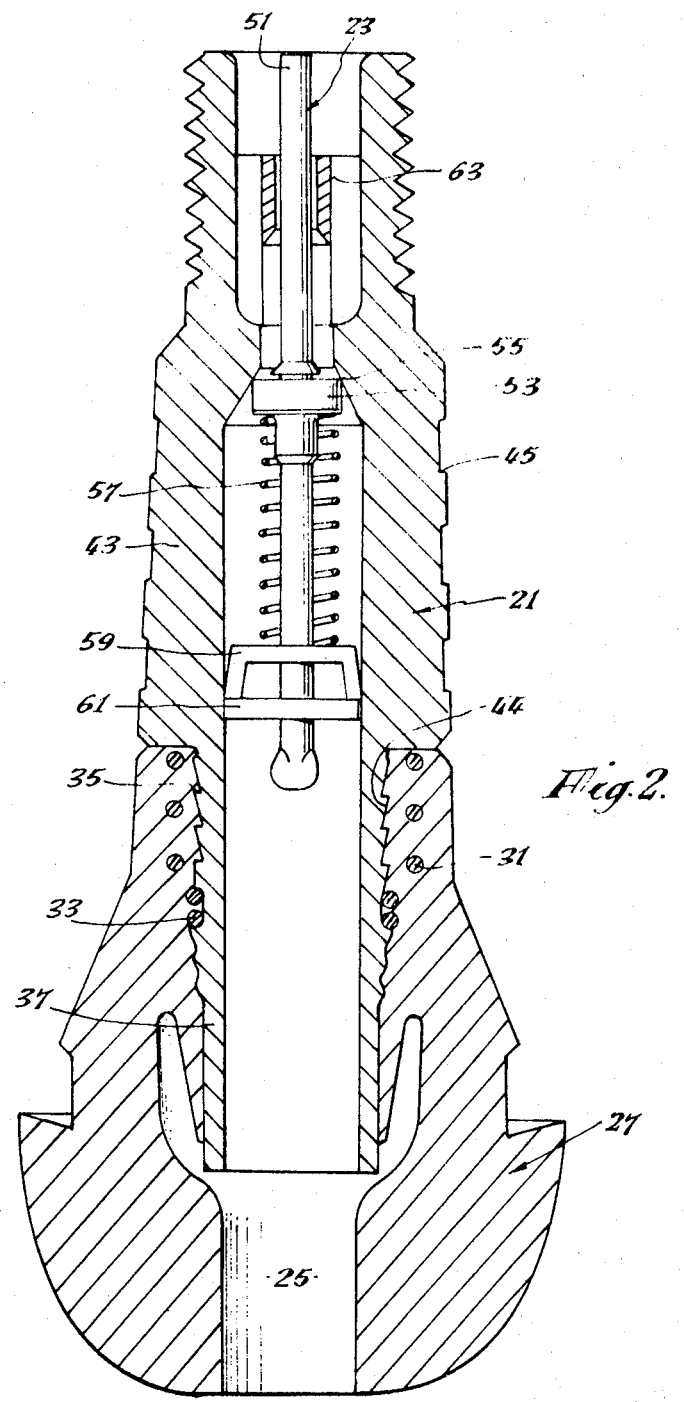
FIG. 2 is a section through a second embodiment with the insert also being shown in section.

Referring now to the second embodiment shown in FIG. 2, a valve includes a rubular insert 21 which has an axial bore adapted to accommodate a valve core 23. A lower portion 41 of tubular insert 21, is enclosed in an axial bore 25 of a resilient housing 27.

The lower portion of the housing 27 is enlarged and has a shoulder 29 which engages the edge of a rim hole in a wheel rim (not shown) on insertion of the valve in a manner known per se.

The insert 21 is secured relative to the housing 27 by means of a hard radially expandable member, which is in this case a coil compression spring 31 moulded into the housing 27 around the surface of the part of the axial bore 25 which contains the insert 21. The coils of the spring are embedded in the housing during moulding of the latter. The diameter of the bore 25 is smaller than the diameter of the insert 21.

Two lower coils 33 of the spring 31 are of a smaller diameter than the rest. This is mainly as an aid to manufacture, during placing of the spring into the housing; the spring 31 can be held by these coils 33 so as to keep the spring centred. The said coils also provide increased grip on the insert 21 when the valve is assembled.

The insert 21 has on the surface of its lower, minor portion 41 a number of projections in the form of conical serrations 35 which engage in the bore 25, constructed by the rubber covered coils of the spring 31, which assist in securing the insert. The diameter of the lower portion 41 of the insert 15 is chosen to be greater than the internal bore of the housing 27 before insertion so that a force fit is obtained, the insert being held in position by a gripping action of the spring. Preferably, the dimensions are chosen to give a good interference fit between the bore 25 and the spring and the conical serrations, the maximum interference being when the narrowest parts on the insert are wider than the widest part of the internal surface of the housing.

During assembly, the minor portion 41 of the insert 21 is inserted under pressure into the top of the housing 27 containing the spring 31. This pressure causes compression of the spring and resilient housing, which effectively opens out the coils of the spring to enlarge the bore 25 and allow passage of the insert 21. The end 37 of the insert is forced through the smaller coils 33 which engage in the first recess of the insert. The pressure is released and the spring and resilient housing tend to recover, the bore 25 thus contracts and grips the insert 21. Attempts to pull the insert 21 back out of the housing 27 are resisted by the spring 31, any such loads which tend to extend the spring cause the coils further to contact and the bore 25 to grip harder onto the insert. Attempts to twist the insert out of the stem give rise to torsional forces which tend to wind-up the spring again resulting in contraction and increased grip.

The insert 21 is therefore very securely retained in the housing 27 by the mechanical action of the spring 31, dispensing with the need for chemical bonding or adhesive.

An upper portion 43 of the insert 21 has a greater diameter than the lower portion 41 and is slightly upwardly tapered so as to follow the line of the outer surface of the housing 27. In the outward appearance of the valve it seems as if the housing 27 were continuous with the portion 43. The outer surface of the portion 43 has a number of annular ribs 45.

This embodiment is a modification of the first embodiment described above in that the resilient housing 27 and the integrally moulded spring 31 are shorter, but it has been found that this shorter spring gives a sufficient grip on the insert 21 to maintain it in position and to provide an air-tight seal. This valve may also be easier to manufacture since the shorter spring can be held more easily during moulding and the insert can be inserted more quickly.

The enlarged upper portion 43 of the insert is integrally moulded as part of the insert 21 but so as to externally resemble other valves when assembled. The ribs 45 may be dispensed with, the surface remaining plain, or the surface may be grooved or knurled. The provision of ribs, grooves or other gripping surface assists in pulling the valve into a wheel rim.

The valve core 23 illustrated includes a pin 51 carrying a valve portion 53 which co-operates with a shoulder 55 in the bore of the insert to close the valve. A spring 57 urges the valve portion and shoulder into engagement. The spring is supported in the bore by resting upon a cross-bar of a bridge which is wedged in the bore by an interference fit over a short axial length by an annular portion 61 of the bridge. The cross-bar 59 is axially spaced from the annular portion 61 of the bridge so as to allow a good air flow through the valve. The pin passes slidingly through an aperture in the cross-bar and is axially guided at its upper portion by an integrally moulded web 63 in the insert.

The axial bore of the insert 21 may be modified to accommodate any desired valve core instead of the core 23 illustrated in the drawing.

In a further modification of this embodiment, the enlarged upper portion 43 could be dispensed with, a comparatively long uniform portion of the insert would then project from the resilient housing 27. The projections on the insert 21 may alternatively be square sections, in the form of a buttress thread.

Figure 3:
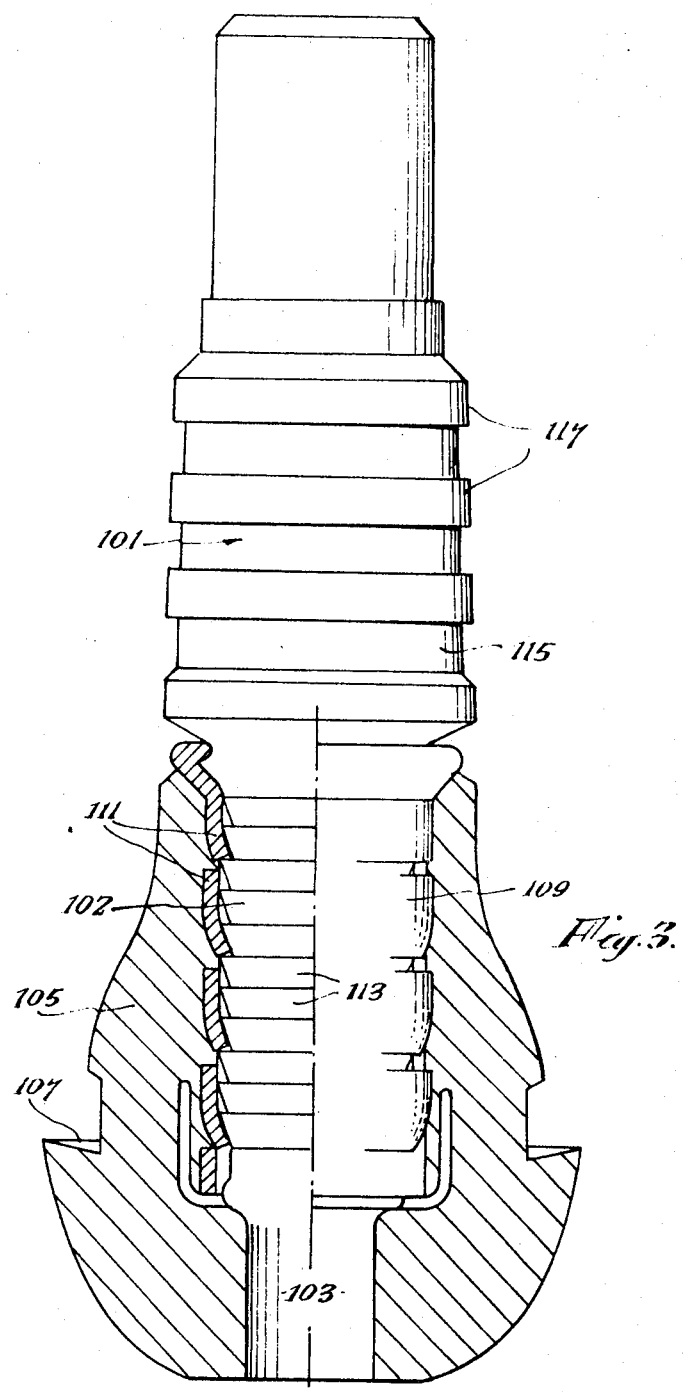
FIG. 3 is a part-sectional view of a third embodiment.

Referring to the third embodiment shown in FIG. 3, the valve includes a tubular insert 101 which has an axial bore adapted to accommodate a valve core (not shown). A lower portion 102 of the insert 101 is enclosed in an axial bore 103 of a resilient housing 105.

The lower portion of the housing 105 is enlarged and has a shoulder 107 which engages the edge or a rim hole in a wheel rim (not shown) on insertion of the valve in a manner known per se.

The insert 101 is secured relative to the housing 105 by means of a hard radially expandable member which is a tubular louvered member 109 moulded into the housing 105 around the surface of the axial bore 103 which contains the insert 101. The member 109 has four sets of pressed-out louvres 111 which extend inwardly and downwardly relative to the axial bore 103. The diameter of the bore 103 measured between the innermost tips of the louvres 111 is smaller than the diameter of the portion 102 of the insert 101.

The lower portion 102 of the insert 101 has a plurality of conical serrations 113 on its surface which provide projections for engaging with the inwardly projecting tips of the louvres 111 to secure the insert in the bore 103. Preferably the relative dimensions of the insert and the bore 103 give a good interference fit between them, the maximum interference being when the narrowest parts within the serrations on the insert 101 are about the same width as the widest parts of the internal surface of the bore 103.

The upper portions 115 of the insert 101 is enlarged and has ribs 117 providing a gripping surface to assist when pulling the valve into a wheel rim. The shape of this portion 115 is such as to give a substantially continuous surface contour with the surface of the resilient housing 105. In this, it resembles the second embodiment described above. In place of the ribs 117, the surface may be plain, knurled or grooved.

During assembly the lower portion 102 of the insert is inserted under pressure into the resilient housing 105. This pressure causes radial expansion of the louvres 111, their tips being pressed back towards the line of the tubular member 109, allowing the insert to pass. When the pressure is released after the insert is in place, the louvres 111 will settle into engagement with the serrations 113 thus constricting the bore 103 onto the insert 101 and gripping it. Attempts to pull the insert back out of the resilient stem are resisted by engagement of the tips of the louvres 111 with the shoulders of the serrations 113 which may tend to pull the louvres even further inwardly to grip the insert more securely. Twisting the insert will not disengage the louvres from the serrations 113. The insert is thus firmly held in the housing by the mechanical action of the tubular louvred member 109, dispensing with the need for chemical or adhesive bonding.

In the fourth embodiment the radially expandable member is a helical spring, the action of which is as described with reference to the second embodiment of FIG. 2. The lower portion of the present insert differs however in that the conical serrations are replaced by a continuous screw thread 201 which engages between the coils of the helical spring 203 to be gripped thereby. To assemble the valve the insert is simply screwed into the resilient housing, the compression produced expands the bore of the housing to allow relatively easy passage of the insert. Once the insert is in place and the pressure released, the spring contracts and constricts the bore so as to grip the insert securely. Attempts to unscrew the insert will be resisted by a tendency in the spring to coil up more tightly, thus constricting the bore still further.

A further modification can be seen in the resilient housing which is formed with an annular rib 205 around the axial bore just above the lower edge of the insert which seats in a recessed annular portion of the insert.

This forms an O-ring seal with the insert to further assist in preventing escape of air between the insert and the housing. This rib on the resilient housing may be used in any of the other embodiments.

These methods of retention allow the insert to be made of a plastics material, which may be glass-filled nylon, instead of metal, although the latter could be used. Such inserts can be moulded and are much cheaper to produce than metal ones. Plastics inserts cannot easily be used with the chemical bonding method of securing since they tend to deform under heat and lose their shape, which is undesirable.

Adequate sealing is obtained with the valves described above as the rubber-covered coils of the spring or of the rubber-covered louvres of the tubular member which are compressed against the surface of the insert act in the manner of an O-ring in preventing the escape of air from the tyre.

The spring or louvred tubular member can be made of steel or brass or any other suitable hard material and may be coated with rubber adhesive before moulding into the housing. The material of the spring should, however, be able to withstand the moulding conditions, for example the high temperature.

In place of the above-described compression spring, any suitable helical member may be used which will grip the insert to retain it relative to the housing.

The housing may be made of rubber, natural or synthetic, or of any suitable resilient plastics material which will allow the enlarged portion to be inserted in the wheel rim and be retained there.

What we claim is:

1. A snap-in tire valve comprising:
   a. a rigid tubular insert adapted to be provided with a valve, the insert being formed in a lower section of the outer surface thereof with outward rib means; and
   b. a housing including a rubber base having an axial bore receiving the lower section of the insert, the base having an enlargement adjacent the lower end thereof, the enlargement formed with a peripheral groove thereabout adapted to engage sealingly the valve hole opening of a tire rim, the housing including a retaining member of metal or the like molded into the rubber base and circumposing the bore, at least the portions of the retaining member closest to the bore being capable of stiffly yielding outwardly during installation of the insert into the bore, the bore of the housing having peripheral groove means interfitting with the rib means of the insert;

whereby the retaining member forces the closing of the bore about the insert to produce a tight seal and blocks the removal of the insert.

2. A valve as described in claim 1 wherein the retaining member is a tubular louvred member embedded in the rubber base around the surface of the axial bore, the louvres being inwardly and downwardly extending with respect to the bore so that on insertion of the insert the louvres may expand to allow the insert to pass but will resiliently grip the rib means on the insert to prevent its being pulled out of the housing.

3. A snap-in tire valve as claimed in claim 1 wherein the member is a helical spring.

4. A snap-in tire valve as claimed in claim 3 wherein the lower turns of the helical spring are of lesser diameter than the upper portions.

5. A snap-in tire valve as claimed in claim 1 wherein the ribs and grooves have sawtooth profiles including opposed substantially radial surfaces, the radial surfaces on the housing facing downward and the radial surfaces on the insert facing upward.

6. A snap-in tire valve as claimed in claim 1 wherein the tubular insert is plastic.

7. A snap-in tire valve as claimed in claim 1 wherein the retaining member is metal.

8. A snap-in tire valve as described in claim 1 wherein the tubular insert is shaped so that its outer surface is substantially continuous with the outward surface of the housing.

9. A snap-in tire valve comprising:
   a. a rigid plastic tubular insert containing valve means, the insert being formed in a lower section of the outer surface thereof with outward annular rib means having upwardly facing generally radial surfaces; and
   b. a housing including a rubber base having an axial bore snugly receiving the lower section of the insert, the base having an outward enlargement adjacent the lower end thereof, the enlargement formed with a peripheral groove thereabout adapted to engage sealingly the valve hole opening of a tire rim, the housing including a helical spring of metal into the rubber base and circumposing the bore in the area of the lower section of the tubular insert, being capable of stiffly yielding outwardly during installation of the insert into the bore, the bore of the housing having peripheral groove means interfitting with the rib means of the insert;

whereby the spring forces the closing of the bore about the insert to produce a tight seal and blocks the removal of the insert.

10. A snap-in tire valve as claimed in claim 9 wherein the lower turns of the helical spring are of lesser diameter than the upper portions.

11. A snap-in tire valve as described in claim 9 wherein the tubular insert is shaped so that its outer surface is substantially continuous with the outer surface of the housing.

12. A valve for tubeless tires mounted on a rim and comprising a rubber base having an axial bore and a peripheral rim-hole-engaging groove, a metal helical spring bonded in the rubber base and surrounding the axial bore, and a hard plastic tubular valve insert extending into the axial bore and having its periphery sealingly engaged in compressive engagement by the rubber surrounding the bore, urged partly by the natural resilience of the rubber and partly by the inward compression of the spring.

13. A snap-in tire valve for an automobile tire mounted on a rim and adapted to snap into a tire valve opening in such a rim, the valve comprisng a rubber snap-in tire valve housing having a central opening, the housing having molded thereinto a helical spring surrounding the opening, and a rigid plastic tube-like valve-containing insert having an irregular outer surface impaling the housing through the opening, the housing portions surrounding the insert engaging it in leakproof fit, urged by the resilience of the rubber and spring, the insert being partly held against axial displacement of the housing by the irregular character of the outer surface.

* * * * *